March 15, 1960  J. A. HERRMANN ET AL  2,929,044
UNIVERSAL TROLLEY DUCT CONNECTING MEANS
Filed May 29, 1956  3 Sheets-Sheet 1
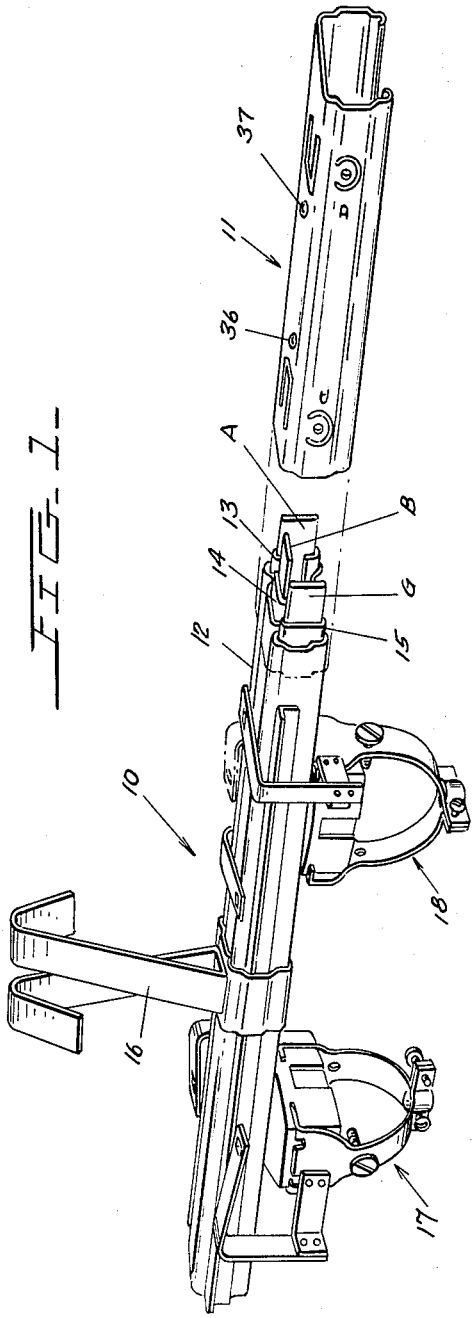
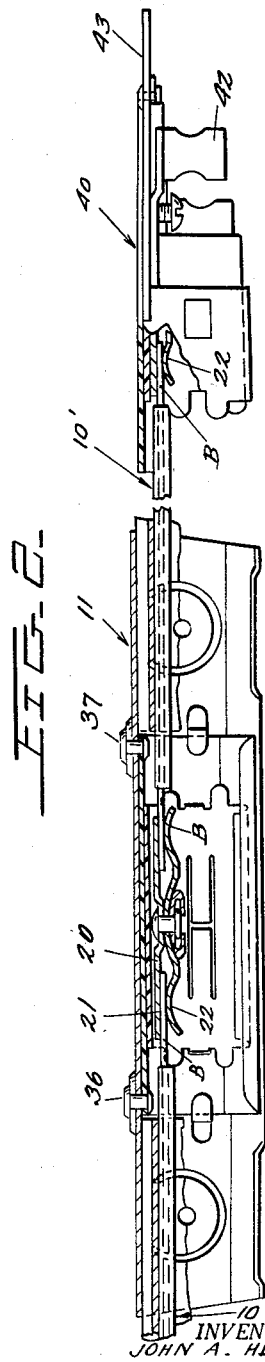
INVENTORS
JOHN A. HERRMANN
RUSSELL S. DAVIS
GEORGE H. FARNSWORTH
BY
Ostrolenk, Faber,
Gerb & Soffen
ATTORNEYS

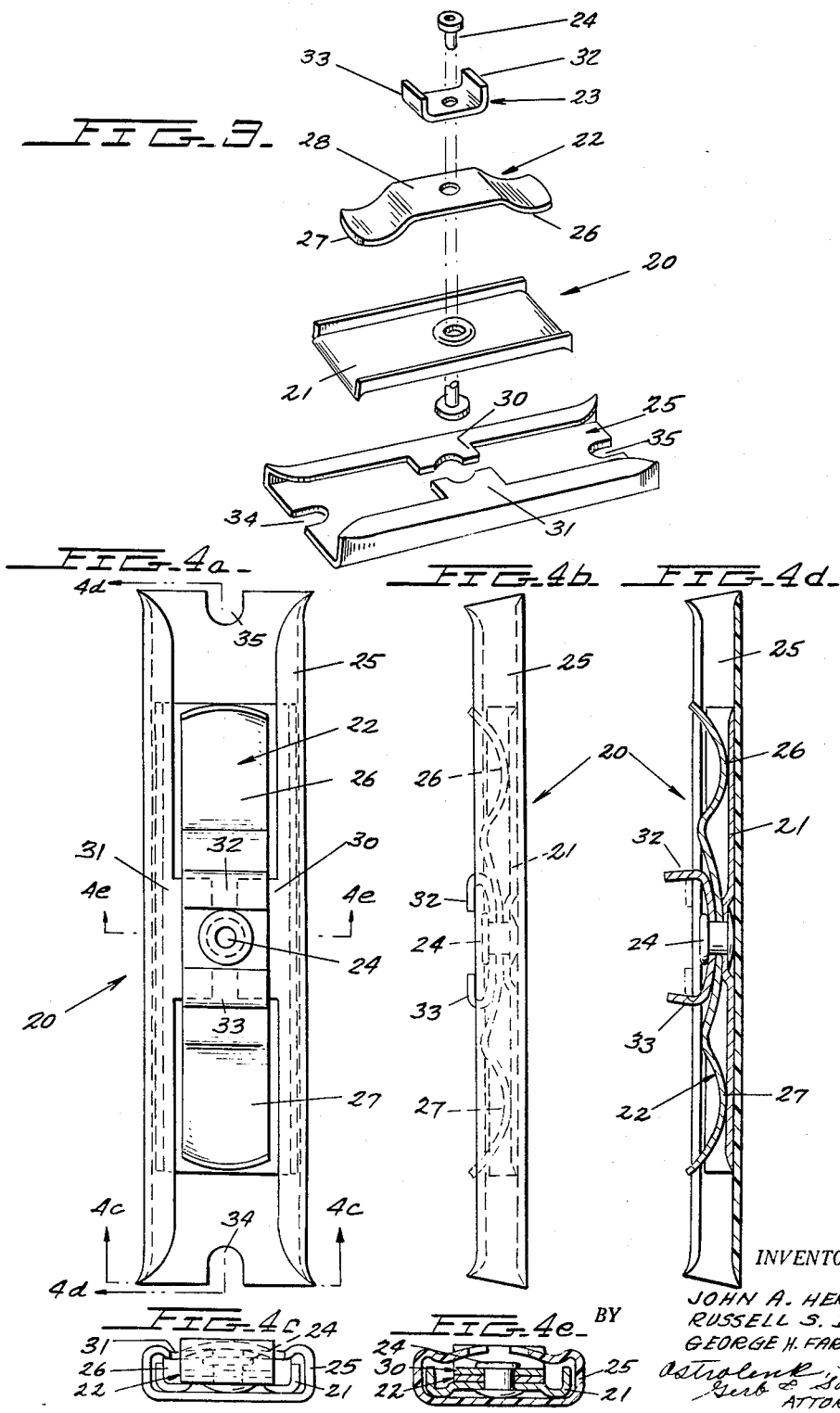

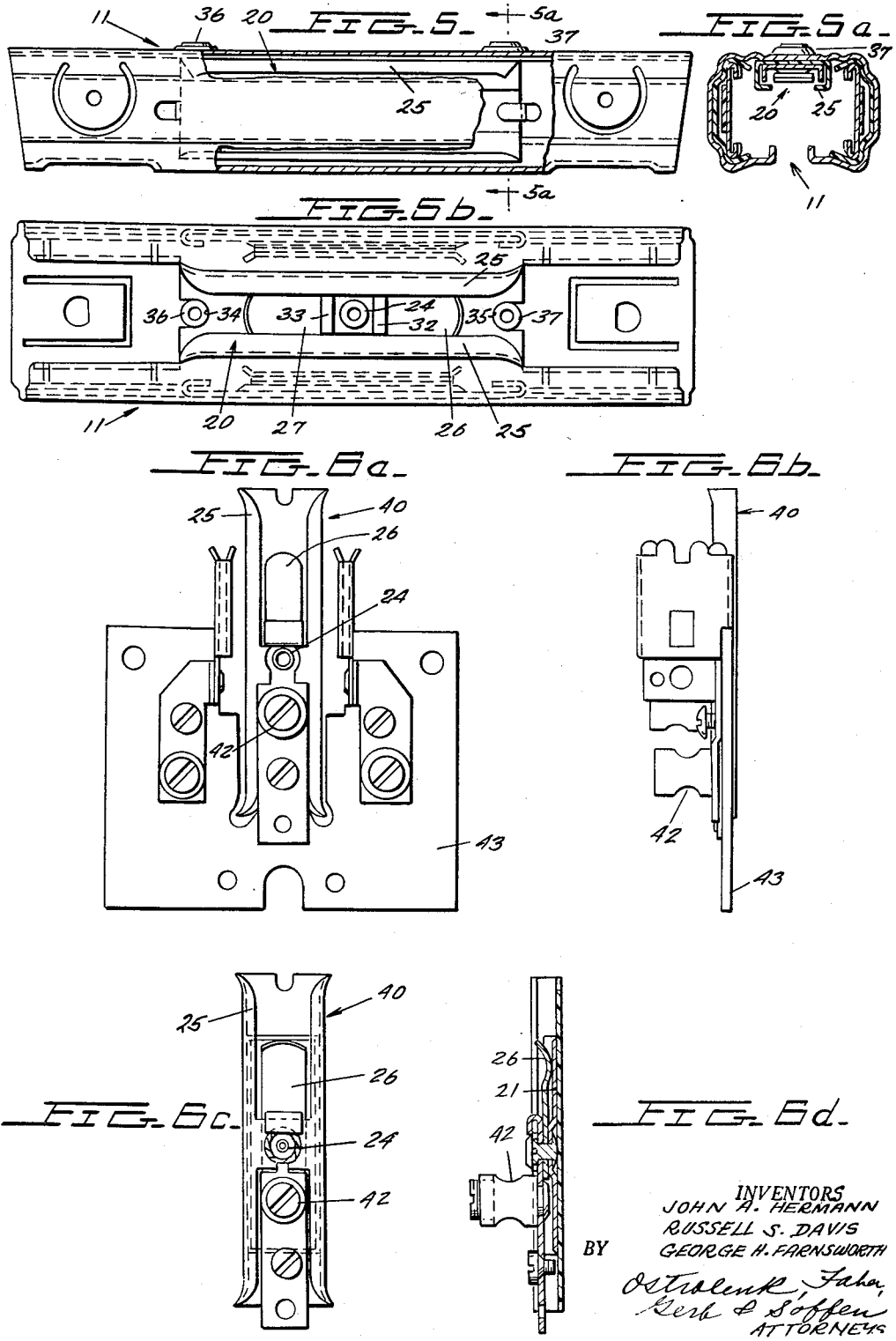

United States Patent Office 2,929,044
Patented Mar. 15, 1960

2,929,044

UNIVERSAL TROLLEY DUCT CONNECTING MEANS

John A. Herrmann, Grosse Pointe Farms, Russell S. Davis, and George H. Farnsworth, Detroit, Mich., assignors to Bulldog Electric Products Company, Detroit, Mich., a corporation of West Virginia Application May 29, 1956, Serial No. 588,141

4 Claims. (Cl. 339—205)

Our invention is related to universal trolley duct and more particularly is directed to the manner in which unit sections of the trolley duct can be coupled to each other as well as the connection for the end feed-in terminals to the unit section.

Universal trolley duct systems are generally used in industrial plants wherein it is desired to have a semi-permanent installation of an electric distribution system in which removable connections can readily be made for energizing loads. In these systems the conductors are contained within a housing and the entire assembly is made up of unit sections which must be connected or coupled together during the initial installation. That is, the unit sections, which may be no more than three or four feet in length, are mass produced at the factory along with coupling units so that a trolley duct system can easily be assembled at its point of use. With the rapid advance of the American economy, it has been commonplace for industry to make annual changes in its products therefore necessitating complete physical relocation of its equipment. Therefore, it is desirable to provide an arrangement wherein the installed trolley duct be assembled in such a manner as to provide a semi-permanent installation for long periods of time, such as a year, and still enable the user to readily disassemble the system and reinstall it at another location. That is, the unit sections of the universal trolley duct system are removably coupled to each other as is the end feed-in terminal connection of the system.

Our invention is directed to a simplified disconnect means whereby unit sections can be removably connected to each other. As noted, the unit sections are comprised of a housing containing the bus bars and a coupling device is provided whereby one unit section can be electrically connected to its adjacent unit section through the coupling member by way of a removable connection. The coupling member has a pair of disconnect contacts associated with each bus of the unit section. The disconnect contacts in the coupling member are comprised of a first and second conductor and a clip member, all of which are secured to each other by a single rivet. This assembly is maintained within an insulating member and secured thereto by means of the clip. Hence, the completed assembly serves as a pair of disconnect contacts and is readily and easily assembled. The assembly can thereafter be easily secured to the housing of the coupling member by passing rivets through the insulating member.

Hence, the insulation serves to secure the disconnect contacts to the housing, to provide the required dielectric strength between the disconnect contacts and the housing, and also to hold and position the disconnect contacts. A similar type of arrangement can also be used for the feed-in terminal wherein there is a single disconnect contact energized from a terminal.

Accordingly, a primary object of our invention is to provide an arrangement whereby a novel disconnect contact arrangement for a trolley duct system wherein the disconnect contacts are readily and easily assembled.

Another object of our invention is to provide a disconnect contact arrangement having insulating means which serve to hold and position the contacts, to provide a dielectric barrier between the contacts and the housing, and serve as a mounting means to secure the contacts to the housing.

Another object of our invention is to provide a simplified disconnect contact arrangement comprised of two conductors which form two pairs of cooperating contacts that are positioned, supported and insulated by a single member.

These and other objects of our invention will become apparent from the following description when taken in connection with the drawings in which:

Figure 1 is a perspective view illustrating one unit section of trolley duct and a typical coupling member as well as the tap-off units which can be connected to the trolley duct system.

Figure 2 is a cross-sectional view of the coupling member illustrating the novel disconnect contact arrangement within the coupling member as well as the manner in which the buses of the unit sections are electrically connected to the disconnect contacts.

Figure 3 is an exploded perspective view of our novel disconnect contact assembly.

Figure 4a is a top view of the disconnect contact assembly of Figure 3.

Figure 4b is a side view of the disconnect contact assembly of Figure 4a.

Figure 4c is an end view taken in the direction of the arrows 4c—4c of Figure 4a.

Figure 4d is a longitudinal cross-sectional view taken in the direction of the arrows 4d—4d of Figure 4a.

Figure 4e is a transverse cross-sectional view taken in the direction of the arrows 4e—4e of Figure 4a.

Figure 5 is a side view of the coupling member of Figures 1 and 2.

Figure 5a is a cross-sectional view of the coupling member taken in the direction of the arrows 5a—5a of Figure 5.

Figure 5b is a bottom view of the coupling member of Figure 5.

Figure 6a is a view of a feed-in terminal illustrating the manner in which our novel disconnect assembly can be modified for an end feed-in device.

Figure 6b is a side view of the embodiment of Figure 6a.

Figure 6c is a top view of the disconnect contact assembly used in the arrangement of Figure 6a.

Figure 6d is a side view of the embodiment shown in Figure 6a.

Referring to Figure 1, the trolley duct system is comprised of a plurality of unit sections such as the unit sections seen in 10, which are coupled to each other by coupling members 11.

The unit section 10 is comprised of a metal housing 12 which is formed to support bus bars such as A, B and G on the interior thereof. Each of the bus bars or conductors A, B, G is provided with appropriate insulation such as 13, 14 and 15 to provide a dielectric barrier between the buses and the metal housing 12. The entire assembly may be supported from a wire or any other desirable means by way of clamping members such as the unit 16. Tap-off units such as 17 and 18 are utilized to provide a removable connection between the trolley duct system seen in Figure 1 and loads to be energized thereby.

In the initial assembly of the plurality of unit sections such as 10, it is necessary to provide an electrical coupling means between the bus A of one unit section and its corresponding bus A in the adjacent unit section as well as a comparable connection for bus bars B and G respectively. To this end the coupling member 11 must provide three separate disconnect contact assemblies, each of which is associated with one of the bus bars and has a pair of disconnect contacts to thereby electrically connect the corresponding bus bars of adjacent unit sections. This is seen in the cross-sectional view of Figure 2 which illustrates the manner in which the bus bar B in the unit section 10, at the left hand side of the drawing, is electrically connected to the bus B in unit section 10', seen at the right hand end of the drawing. This is achieved by means of the disconnect contact assembly 20.

That is, the bus bars B are sandwiched between the conductors 21, 22 of the disconnect contact assembly 20. The disconnect contact assembly 20 is best seen in the exploded perspective view of Figure 3 and the detailed views of Figures 4a, 4b, 4c, 4d and 4e. The assembly is comprised of five basic parts, namely, the cooperating conductors 21, 22, clip 23, rivet 24 and the unitary insulating member 25. The conducting members 21, 22 and the clip unit 23 are all secured to each other by means of the rivet 24. As is best seen in the exploded perspective view of Figure 3 as well as the side and cross-sectional view of Figures 4b and 4d, the conducting member 22 is formed so that its end portions 26, 27 are curved downwardly with its central portion 28 being a flat surface in a plane above the end portions 26, 27. Thus, when the conducting members are assembled by means of the rivet 24, the center section 28 of the conductor 22 is urged downwardly against the flat surface of the pan shaped conductor 21 to thereby bring its end sections 26, 27 into high pressure engagement with the flat surface of the conductor 21. Due to the resiliency of the conducting member 22, a conductor or bus such as B from a unit section 10 can be positioned between the conductor 22 and the conductor 21. Since the rivet 24 initially distorts the configuration of the conductor 22 the end fingers 26, 27 will result in high pressure contact with the bus which is positioned between them and the conductor 21 such as seen in Figures 2, 4b and 4d. The insulating member 25, as seen in the end and cross-sectional views of Figures 4c and 4e, has a C shaped configuration in which the conductive sub-assembly 21, 22, 23, 24 is positioned. The extensions 30, 31 are than straddled by the clip 23, and hence, the ends 32, 33 of the clip can be bent down from the position of Figure 4d to the position of Figure 4b to thereby secure and position the conductive sub-assembly with respect to the insulating member 25. Thus, a completed disconnect contact assembly having two pairs of contacts can be readily assembled in a very simple and economical manner.

The manner in which the disconnect contact assembly of Figures 3 and 4 is secured within the housing of the coupling member 11 is seen in Figures 2, 5, 5a and 5b. The insulating member 25 is provided with openings 34, 35 at each end to receive rivets 36 and 37. Thus, the rivets 36, 37 extend through the metal housing 11, through the openings 34, 35 of the disconnect contact assembly 20 to thereby secure this assembly to the housing 11. Thus, it will be noted that the insulating member 25 serves to support and position the conductive sub-assembly 21, 22, 23, 24, also provides the insulating means between the conductive sub-assembly and the metal housing 11, and furthermore serves to hold and secure the conductive assembly within the housing 11.

In the arrangement shown in Figures 1–5, our novel disconnect contact assembly has been used to electrically connect the bus bars of adjacent sub-sections to each other in the manner seen in Figures 1 and 2. The internal portion of the housing of the coupling member 11 has a configuration similar to the exterior configuration of the housing comprising the unit sections 10. Thus, adjacent unit sections 10 can be placed inside the coupling member 11 so that their bus bars extend into the contacts or jaws formed by 21, 22 to thereby electrically interconnect corresponding bus bars of adjacent unit sections.

The disconnect contact assembly has heretofore been described in connection with coupling adjacent unit sections although it will be apparent to those skilled in the art that this unit can also be readily adapted for a feed-in device such as illustrated in Figures 6a, 6b, 6c and 6d. In this arrangement the connecting means 40 is still contained within a single insulating member 25 and also has conducting members which are secured to each other by means of a rivet 24. However, the upper conducting member 22 although retaining the finger or end section 26 has its opposite end modified to receive a terminal connector 42. The terminal connector 42 can be secured to the lower end of conductor 26 or to the lower end of the lower pan shaped conductor 21 in any desirable manner as for example by soldering or by a threaded engagement therewith. In like manner, the assembled unit 40 can be secured to the base 43 in any desirable manner, as for example by way of rivets passing through its openings in the manner heretofore described in connection with the unit 20 and the coupling member 11. Thus, the end feed-in terminal arrangement seen in Figures 6a, 6b, 6c, 6d would have the conductors from the source of power connected to the terminals 42 to thereby energize the disconnect contacts 26, 21 so that the end unit section 10 connected to the feed-in terminal would have its buses or conductors energized thereby.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. A coupling member for a trolley duct system being comprised of a housing unit for electrically connecting adjacent unit sections, said housing unit having a plurality of disconnect contact assemblies secured to the interior surface thereof, each of said disconnect contact assemblies being comprised of an insulator, a first conductor, a second conductor, a clip and a securing means; said first conductor, second conductor and said clip being rigidly secured to each other by means of said securing means; said securing means placing said first and second conductor in high pressure engagement with each other; said insulator having extensions straddled by said clip whereby said first and second conductors are positioned and held within the confines of insulator, said insulator providing a dielectric barrier between said conductors and said coupling housing and also serving as the means whereby said first and second conductors are supported by said coupling housing.

2. An end feed-in terminal arrangement having an assembly comprised of an insulator, a terminal and a first and second conductor; said first and second conductor secured to each other to form a disconnect contact for electrical engagement with a conductor of a trolley duct section; said terminal electrically connected to said first and second conductors, said conductor of said trolley section capable of being energized from said terminal by way of said first and second conductors of said assembly said insulator being formed of sheet material; said insulator supporting and positioning said first and second conductor and said terminal, said insulator secured to a base of said feed-in terminal arrangement and providing a dielectric barrier between said base and said first and second conductors and said terminal; a clip securing both of said first and said second conductors to said insulator.

3. A coupling disconnect contact assembly for providing a removable and replaceable electrical and mechanical connection between a first and second bus bar; said coupling disconnect contact assembly being comprised of an insulator, a first and second conductor, a clip and a securing means; said securing means fixedly securing said clip, said first conductor and said second conductor to each other; said insulator having extensions extending toward each other and being straddled by said clip whereby said first and second conductor are positioned and mechanically secured within said insulator.

4. A coupling disconnect contact assembly for electrically and mechanically securing a first and second bus bar to each other; said coupling disconnect contact assembly being comprised of an insulator, a first conductor, a second conductor, a clip and a securing means; said first and second conductor and said clip being rigidly secured to each other by means of said securing means; said second conductor having a configuration to permit said securing means to place said first and second conductor in high pressure contact engagement with each other; said insulator having extensions straddled by said clip whereby said first and second conductors are operatively positioned and held within the confines of said insulator; said insulator providing a support for said coupling assembly, said first and second conductors operative to receive a first and second bus bar for electrically and mechanically connecting said bus bars to each other; said clip being constructed with a central portion and two end portions overlying said central portion; said extensions being positioned between said central portion and said two end portions.

References Cited in the file of this patent

UNITED STATES PATENTS

| | | |
|---|---|---|
| 1,145,338 | Vanderhoof | July 6, 1915 |
| 2,043,796 | Frank | June 9, 1936 |
| 2,392,438 | Wade | Jan. 8, 1946 |
| 2,437,339 | Webster | Mar. 9, 1948 |
| 2,578,436 | Lundy | Dec. 11, 1951 |
| 2,585,770 | Hammerly | Feb. 12, 1952 |